US010468880B2

(12) United States Patent
Inam et al.

(10) Patent No.: US 10,468,880 B2
(45) Date of Patent: Nov. 5, 2019

(54) SYSTEMS AND METHODS FOR VOLTAGE REGULATION USING SPLIT-CONDUCTORS WITH LOOP CURRENT REDUCTION

(71) Applicant: Smart Wires Inc., San Francisco, CA (US)

(72) Inventors: Haroon Inam, San Jose, CA (US); Ali Farahani, Orange, CA (US); Andrii Luchko, Foster City, CA (US)

(73) Assignee: Smart Wires Inc., Union City, CA (US)

( * ) Notice: Subject to any disclaimer, the term of this patent is extended or adjusted under 35 U.S.C. 154(b) by 223 days.

(21) Appl. No.: 15/479,563

(22) Filed: Apr. 5, 2017

(65) Prior Publication Data

US 2018/0138702 A1 May 17, 2018

Related U.S. Application Data

(60) Provisional application No. 62/422,188, filed on Nov. 15, 2016.

(51) Int. Cl.
*H02G 5/00* (2006.01)
*H02G 7/00* (2006.01)
*H02J 3/00* (2006.01)
*H02J 3/18* (2006.01)

(52) U.S. Cl.
CPC ............. *H02J 3/00* (2013.01); *H02J 3/1814* (2013.01)

(58) Field of Classification Search
CPC ..................................... H02J 3/00; H02J 5/00
See application file for complete search history.

(56) References Cited

U.S. PATENT DOCUMENTS

| 2,237,812 A | 4/1941 | De Blieux |
| 2,551,841 A | 5/1951 | Kepple et al. |
| 3,556,310 A | 1/1971 | Loukotsky |

(Continued)

FOREIGN PATENT DOCUMENTS

| CH | 660094 | 3/1987 |
| CN | 103256337 | 8/2013 |

(Continued)

OTHER PUBLICATIONS

Amin, S. M. et al., "Toward a Smart Grid: Power Delivery for the 21st Century", IEEE power & energy magazine, vol. 3, No. 5, Sep./Oct. 2005, pp. 34-41.

(Continued)

*Primary Examiner* — Alfonso Perez Borroto
*Assistant Examiner* — Esayas G Yeshaw
(74) *Attorney, Agent, or Firm* — Womble Bond Dickinson (US) LLP (57) ABSTRACT

A split-conductor electrical-injection power substation uses an array of series and parallel electrical-injection devices to control power flow in the power grid. The split-conductors allow the use of smaller electrical-injection devices in higher current distribution systems. The electrical injection devices introduce small voltage differences between the split-conductor wires because of electrical injection and sensor variations. The small voltage variations cause large loop currents on the low-impedance wires. Sensors detect current differences in the split-conductor wires and use feedback to adjust injected voltages, thereby reducing the loop currents.

11 Claims, 7 Drawing Sheets

(56) References Cited

U.S. PATENT DOCUMENTS

| | | |
|---|---|---|
| 3,704,001 A | 11/1972 | Sloop |
| 3,750,992 A | 8/1973 | Johnson |
| 3,913,003 A | 10/1975 | Felkel |
| 4,025,824 A | 5/1977 | Cheatham |
| 4,057,736 A | 11/1977 | Jeppson |
| 4,103,853 A | 8/1978 | Bannan |
| 4,164,345 A | 8/1979 | Arnold et al. |
| 4,200,899 A | 4/1980 | Volman et al. |
| 4,277,639 A | 7/1981 | Olsson |
| 4,286,207 A | 8/1981 | Spreadbury et al. |
| 4,323,722 A | 4/1982 | Winkelman |
| 4,367,512 A | 1/1983 | Fujita |
| 4,514,950 A | 5/1985 | Goodson, Jr. |
| 4,562,360 A | 12/1985 | Fujimoto |
| 4,577,826 A | 3/1986 | Bergstrom et al. |
| 4,710,850 A | 12/1987 | Jahn et al. |
| 4,821,138 A | 4/1989 | Nakano et al. |
| 4,903,927 A | 2/1990 | Farmer |
| 5,006,846 A | 4/1991 | Granville et al. |
| 5,023,768 A | 6/1991 | Collier |
| 5,032,738 A | 7/1991 | Vithayathil |
| 5,193,774 A | 3/1993 | Rogers |
| 5,461,300 A | 10/1995 | Kappenman |
| 5,469,044 A | 11/1995 | Gyugyi et al. |
| 5,513,061 A * | 4/1996 | Gelbien .............. H02H 7/262 361/63 |
| 5,610,501 A | 3/1997 | Nelson et al. |
| 5,648,888 A | 7/1997 | Le Francois et al. |
| 5,844,462 A | 12/1998 | Rapoport et al. |
| 5,884,886 A | 3/1999 | Hageli |
| 5,886,888 A | 3/1999 | Akamatsu et al. |
| 5,986,617 A | 11/1999 | McLellan |
| 6,088,249 A | 7/2000 | Adamson |
| 6,134,105 A | 10/2000 | Lueker |
| 6,147,581 A | 11/2000 | Rancourt et al. |
| 6,215,653 B1 | 4/2001 | Cochran et al. |
| 6,233,137 B1 | 5/2001 | Kolos et al. |
| 6,335,613 B1 | 1/2002 | Sen et al. |
| 6,486,569 B2 | 11/2002 | Couture |
| 6,727,604 B2 | 4/2004 | Couture |
| 6,831,377 B2 | 12/2004 | Yampolsky et al. |
| 6,895,373 B2 | 5/2005 | Garcia et al. |
| 6,914,195 B2 | 7/2005 | Archambault et al. |
| 7,090,176 B2 | 8/2006 | Chavot et al. |
| 7,091,703 B2 | 8/2006 | Folts et al. |
| 7,105,952 B2 | 9/2006 | Divan et al. |
| 7,193,338 B2 | 3/2007 | Ghali |
| 7,352,564 B2 | 4/2008 | Courtney |
| 7,460,931 B2 | 12/2008 | Jacobson |
| 7,642,757 B2 | 1/2010 | Yoon et al. |
| 7,688,043 B2 | 3/2010 | Toki et al. |
| 7,834,736 B1 | 11/2010 | Johnson et al. |
| 7,835,128 B2 | 11/2010 | Divan et al. |
| 7,932,621 B1 | 4/2011 | Spellman |
| 8,019,484 B2 | 9/2011 | Korba et al. |
| 8,249,836 B2 | 8/2012 | Yoon et al. |
| 8,270,558 B2 | 9/2012 | Dielissen |
| 8,310,099 B2 | 11/2012 | Engel et al. |
| 8,401,709 B2 | 3/2013 | Cherian et al. |
| 8,441,778 B1 | 5/2013 | Ashmore |
| 8,497,592 B1 | 7/2013 | Jones |
| 8,680,720 B2 | 3/2014 | Schauder et al. |
| 8,681,479 B2 | 3/2014 | Englert et al. |
| 8,816,527 B1 | 8/2014 | Ramsay et al. |
| 8,825,218 B2 | 9/2014 | Cherian et al. |
| 8,867,244 B2 | 10/2014 | Trainer et al. |
| 8,872,366 B2 | 10/2014 | Campion et al. |
| 8,890,373 B2 | 11/2014 | Savolainen et al. |
| 8,896,988 B2 | 11/2014 | Subbaiahthever et al. |
| 8,922,038 B2 | 12/2014 | Bywaters et al. |
| 8,957,752 B2 | 2/2015 | Sharma et al. |
| 8,996,183 B2 | 3/2015 | Forbes, Jr. |
| 9,099,893 B2 | 8/2015 | Schmiegel et al. |
| 9,124,100 B2 | 9/2015 | Ukai et al. |
| 9,124,138 B2 | 9/2015 | Mori et al. |
| 9,130,458 B2 | 9/2015 | Crookes et al. |
| 9,172,246 B2 | 10/2015 | Ramsay et al. |
| 9,178,456 B2 | 11/2015 | Smith et al. |
| 9,185,000 B2 | 11/2015 | Mabilleau et al. |
| 9,207,698 B2 | 12/2015 | Forbes, Jr. |
| 9,217,762 B2 | 12/2015 | Kreikebaum et al. |
| 9,246,325 B2 | 1/2016 | Coca Figuerola et al. |
| 9,325,173 B2 | 4/2016 | Varma et al. |
| 9,331,482 B2 | 5/2016 | Huang |
| 9,563,218 B2 * | 2/2017 | Hall .................. H02J 3/14 |
| 9,659,114 B2 | 5/2017 | He et al. |
| 9,843,176 B2 | 12/2017 | Gibson et al. |
| 2002/0005668 A1 | 1/2002 | Couture |
| 2002/0042696 A1 | 4/2002 | Garcia et al. |
| 2003/0006652 A1 | 1/2003 | Couture |
| 2003/0098768 A1 | 5/2003 | Hoffmann et al. |
| 2004/0153215 A1 * | 8/2004 | Kearney .............. H02H 3/063 700/293 |
| 2004/0217836 A1 | 11/2004 | Archambault et al. |
| 2005/0052801 A1 | 3/2005 | Ghali |
| 2005/0073200 A1 | 4/2005 | Divan et al. |
| 2005/0194944 A1 | 9/2005 | Folts et al. |
| 2005/0205726 A1 | 9/2005 | Chavot et al. |
| 2006/0085097 A1 | 4/2006 | Courtney |
| 2007/0135972 A1 | 6/2007 | Jacobson |
| 2007/0250217 A1 | 10/2007 | Yoon et al. |
| 2008/0103737 A1 | 5/2008 | Yoon et al. |
| 2008/0157728 A1 | 7/2008 | Toki et al. |
| 2008/0177425 A1 | 7/2008 | Korba et al. |
| 2008/0278976 A1 | 11/2008 | Schneider et al. |
| 2008/0310069 A1 | 12/2008 | Divan et al. |
| 2009/0243876 A1 | 10/2009 | Lilien et al. |
| 2009/0281679 A1 | 11/2009 | Taft et al. |
| 2010/0026275 A1 | 2/2010 | Walton |
| 2010/0177450 A1 * | 7/2010 | Holcomb .............. H02H 9/023 361/19 |
| 2010/0213765 A1 | 8/2010 | Engel et al. |
| 2010/0302744 A1 | 12/2010 | Englert et al. |
| 2011/0060474 A1 | 3/2011 | Schmiegel et al. |
| 2011/0095162 A1 | 4/2011 | Parduhn et al. |
| 2011/0106321 A1 | 5/2011 | Cherian et al. |
| 2011/0172837 A1 | 7/2011 | Forbes, Jr. |
| 2012/0105023 A1 | 5/2012 | Schauder et al. |
| 2012/0146335 A1 | 6/2012 | Bywaters et al. |
| 2012/0205981 A1 | 8/2012 | Varma et al. |
| 2012/0242150 A1 | 9/2012 | Ukai et al. |
| 2012/0255920 A1 | 10/2012 | Shaw et al. |
| 2012/0293920 A1 | 11/2012 | Subbaiahthever et al. |
| 2013/0002032 A1 | 1/2013 | Mori et al. |
| 2013/0033103 A1 | 2/2013 | McJunkin et al. |
| 2013/0044407 A1 | 2/2013 | Byeon et al. |
| 2013/0094264 A1 | 4/2013 | Crookes et al. |
| 2013/0128636 A1 | 5/2013 | Trainer et al. |
| 2013/0166085 A1 | 6/2013 | Cherian et al. |
| 2013/0169044 A1 | 7/2013 | Stinessen et al. |
| 2013/0182355 A1 | 7/2013 | Coca Figuerola et al. |
| 2013/0184894 A1 | 7/2013 | Sakuma et al. |
| 2013/0200617 A1 | 8/2013 | Smith et al. |
| 2013/0249321 A1 | 9/2013 | Gao et al. |
| 2013/0277082 A1 | 10/2013 | Hyde et al. |
| 2013/0345888 A1 | 12/2013 | Forbes, Jr. |
| 2014/0008982 A1 * | 1/2014 | Powell .................. G01D 4/002 307/31 |
| 2014/0025217 A1 | 1/2014 | Jin et al. |
| 2014/0032000 A1 | 1/2014 | Chandrashekhara et al. |
| 2014/0111297 A1 | 4/2014 | Earhart et al. |
| 2014/0129195 A1 | 5/2014 | He et al. |
| 2014/0132229 A1 | 5/2014 | Huang |
| 2014/0153383 A1 | 6/2014 | Mabilleau et al. |
| 2014/0188689 A1 | 7/2014 | Kalsi et al. |
| 2014/0203640 A1 | 7/2014 | Stinessen |
| 2014/0210213 A1 | 7/2014 | Campion et al. |
| 2014/0246914 A1 | 9/2014 | Chopra et al. |
| 2014/0247554 A1 | 9/2014 | Sharma et al. |
| 2014/0266288 A1 * | 9/2014 | Trabacchin .............. H02S 50/10 324/761.01 |
| 2014/0268458 A1 | 9/2014 | Luciani et al. |
| 2014/0312859 A1 | 10/2014 | Ramsay et al. |
| 2014/0327305 A1 | 11/2014 | Ramsay et al. |

(56) References Cited

U.S. PATENT DOCUMENTS

| | | |
|---|---|---|
| 2014/0347158 A1 | 11/2014 | Goeke et al. |
| 2015/0012146 A1 | 1/2015 | Cherian et al. |
| 2015/0029764 A1 | 1/2015 | Peng |
| 2015/0051744 A1 | 2/2015 | Mitra |
| 2015/0184415 A1 | 7/2015 | Bushore |
| 2015/0226772 A1 | 8/2015 | Kreikebaum et al. |
| 2015/0244307 A1 | 8/2015 | Cameron |
| 2015/0270689 A1 | 9/2015 | Gibson et al. |
| 2016/0036231 A1 | 2/2016 | Ramsay et al. |
| 2016/0036341 A1 | 2/2016 | Jang et al. |
| 2017/0163036 A1 | 6/2017 | Munguia et al. |
| 2017/0169928 A1 | 6/2017 | Carrow et al. |

FOREIGN PATENT DOCUMENTS

| | | |
|---|---|---|
| CN | 203668968 | 6/2014 |
| JP | 2002-199563 | 7/2002 |
| JP | 2005-045888 | 2/2005 |
| JP | 2015-086692 | 5/2015 |
| KR | 10-1053514 | 8/2011 |
| WO | WO-2008/082820 | 7/2008 |
| WO | WO-2014/035881 | 3/2014 |
| WO | WO-2014/074956 | 5/2014 |
| WO | WO-2014/099876 | 6/2014 |
| WO | WO-2015/074538 | 5/2015 |
| WO | WO-2015/119789 | 8/2015 |

OTHER PUBLICATIONS

Angeladas, Emmanouil , "High Voltage Substations Overview (part 1)", Siemens, Jan. 24, 2013, pp. 1-8.

Aquino-Lugo, Angel A. , "Distributed and Decentralized Control of the Power Grid", Ph.D. Dissertation, University of Illinois at Urbana-Champaign, 2010, 172 pp. total.

Dash, P. K. et al., "Digital Protection of Power Transmission Lines in the Presence of Series Connected FACTS Devices", IEEE Power Engineering Society Winter Meeting, 2000, pp. 1967-1972.

Divan, D. M. , "Nondissipative Switched Networks for High-Power Applications", Electronics Letters, vol. 20, No. 7, Mar. 29, 1984, pp. 277-279.

Funato, Hirohito et al., "Realization of Negative Inductance Using Variable Active-Passive Reactance (VAPAR)", IEEE Transactions on Power Electronics, vol. 12, No. 4, Jul. 1997, pp. 589-596.

Gyugyi, Laszlo et al., "Status Synchronous Series Compensator: A Solid-State Approach to the Series Compensation of Transmission Lines", IEEE Transactions on Power Delivery, vol. 12, No. 1, Jan. 1997, pp. 406-417.

Gyugyi, Laszlo et al., "The Interline Power Flow Controller Concept: A New Approach to Power Flow Management in Transmission Systems", IEEE Transactions on Power Delivery, vol. 14, No. 3, Jul. 1999, pp. 1115-1123.

Kavitha, M. et al., "Integration of FACTS into Energy Storage Systems for Future Power Systems Applications", International Journal of Advanced Research in Electrical, Electronics and Instrumentation Engineering, vol. 2, Issue 2, Feb. 2013, pp. 800-810.

Kumbhar, Mahesh M. et al., "Smart Grid: Advanced Electricity Distribution Network", IOSR Journal of Engineering (IOSRJEN), vol. 2, Issue 6, Jun. 2012, pp. 23-29.

Lambert, Frank C. , "Power Flow Control", ISGT Europe, 2014, Istanbul, Turkey, Oct. 13, 2014, pp. 1-15.

Lehmkoster, Carsten , "Security Constrained Optimal Power Flow for an Economical Operation of FACTS-Devices in Liberalized Energy Markets", IEEE Transactions on Power Delivery, vol. 17, No. 2, Apr. 2002, pp. 603-608.

Mali, Bhairavanath N. et al., "Performance Study of Transmission Line Ferranti Effect and Fault Simulation Model Using MATLAB", International Journal of Innovative Research in Electrical, Electronics, Instrumentation and Control Engineering, vol. 4, Issue 4, Apr. 2016, pp. 49-52.

Mutale, Joseph et al., "Transmission Network Reinforcement Versus FACTS: An Economic Assessment", IEEE Transactions on Power Systems, vol. 15, No. 3, Aug. 2000, pp. 961-967.

Ramchurn, Sarvapali D. et al., "Putting the 'Smarts' into the Smart Grid: A Grand Challenge for Artificial Intelligence", Communications of the ACM, vol. 55, No. 4, Apr. 2012, pp. 86-97.

Reddy, D. M. et al., "FACTS Controllers Implementation in Energy Storage Systems for Advanced Power Electronic Applications—A Solution", American Journal of Sustainable Cities and Society, Issue 2, vol. 1, Jan. 2013, pp. 36-63.

Renz, B. A. et al., "AEP Unified Power Flow Controller Performance", IEEE Transactions on Power Delivery, vol. 14, No. 4, Oct. 1999, pp. 1374-1381.

Ribeiro, P. et al., "Energy Storage Systems", Chapters 1-2.4 of Section entitled "Energy Storage Systems" in Electrical Engineering—vol. III, edited by Kit Po Wong, Encyclopedia of Life Support Systems (EOLSS) Publications, Dec. 13, 2009, 11 pp. total.

Schauder, C. D. et al., "Operation of the Unified Power Flow Controller (UPFC) Under Practical Constraints", IEEE Transactions on Power Delivery, vol. 13, No. 2, Apr. 1998, pp. 630-639.

Siemens Sas, , "Portable Power Solutions, "Plug and play" High Voltage E-Houses, skids and mobile high voltage substations up to 420 kV", Nov. 2015, 8 pp. total.

Swain, S. C. et al., "Design of Static Synchronous Series Compensator Based Damping Controller Employing Real Coded Genetic Algorithm", International Journal of Electrical, Computer, Energetic, Electronic and Communication Engineering, vol. 5, No. 3, 2011, pp. 399-407.

Xue, Yiyan et al., "Charging Current in Long Lines and High-Voltage Cables—Protection Application Considerations", 67th Annual Georgia Tech Protective Relaying Conference, Atlanta, Georgia, May 8-10, 2013, pp. 1-17.

Albasri, Fadhel A. et al., "Performance Comparison of Distance Protection Schemes for Shung-FACTS Compensated Transmission Lines", IEEE Transactions on Power Delivery, vol. 22, No. 4, Oct. 2007, pp. 2116-2125.

Bhaskar, M. A. et al., "Impact of FACTS devices on distance protection in Transmission System", 2014 IEEE National Conference on Emerging Trends in New & Renewable Energy Sources and Energy Management (NCET NRES EM), Dec. 16, 2014, pp. 52-58.

Samantaray, S. R. , "A Data-Mining Model for Protection of FACTS-Based Transmission Line", IEEE Transactions on Power Delivery, vol. 28, No. 2, Apr. 2013, pp. 612-618.

* cited by examiner

SYSTEMS AND METHODS FOR VOLTAGE REGULATION USING SPLIT-CONDUCTORS WITH LOOP CURRENT REDUCTION

CROSS-REFERENCE TO RELATED APPLICATIONS

This application claims the benefit of U.S. Provisional Patent Application No. 62/422,188 filed Nov. 15, 2016.

BACKGROUND OF THE INVENTION

1. Field of the Invention

The present invention relates to systems and methods for line balancing and optimizing power transmission over the grid.

2. Prior Art

Congested networks limit system reliability and increase the cost of power delivery by having part of the power dissipated in unbalanced circuits. Unbalanced circuits cause power flow loop currents and have an associated power loss. Also, substantially out-of-phase voltages and currents on the transmission lines reduce the capacity of the lines to transfer real power from the generator to the distribution substation. To remove the out-of-phase voltages limitation, there exists a need to have high-voltage (HV) power grids with transmission lines that are balanced; with power transfer shared substantially using optimization methods; with reasonable power factor; and with controllable phase differences between the alternating voltage and alternating current. These improvements reduce the loop currents and associated losses and increase real power transfer over the grid up to the power transfer capacity of the lines. Active power flow control provides an ideal solution for this power flow problem by altering the line impedances and voltages, and by changing the angle of the voltage on the respective line, thereby controlling power flow. At present, there are few solutions for distributed control of the power grid that are both effective and reliable. One such effective and reliable system is the PowerLine Guardian®—a commercial product available from the assignee of the current application.

Figure 1:
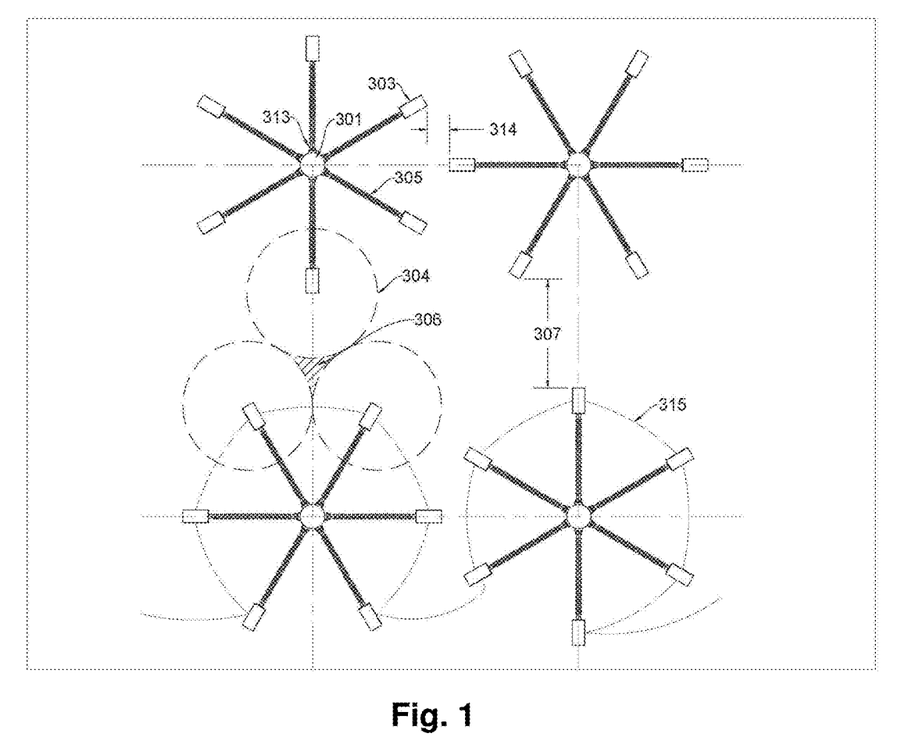
FIG. 1 is a top view of electrical injection substation used for balancing the power grid. (Prior art)

FIG. 1 shows a top view of an electrical injection substation for balancing the power grid. The electrical injection substation contains an array of electrical injection devices (EIDs) 303. The EIDs 303 are mounted on towers 301 using lateral apparatus structural supports 305 which also provide electrical isolation. The primary structural elements, towers 301, are symmetrically loaded around the vertical axis to reduce unbalanced loads on the structural element. The transmission line conductors 315 typically connect to the power grid and are then connected to each device 303 in a series or parallel configuration. The EIDs 303 inject impedance or voltage into the transmission line conductors 315 to modify the voltage and electrical properties to balance the power grid. The lateral apparatus structural supports 305 provide the lateral distance needed to meet clearance requirements to other devices and support elements of tower 301. The lateral apparatus structural support insulators 305 are arranged to maximize the density of devices in a horizontal plane and reduce the interstitial spacing 306 while maintaining each device's radial and horizontal spacing clearances 304, 307, and 314.

Figure 2:
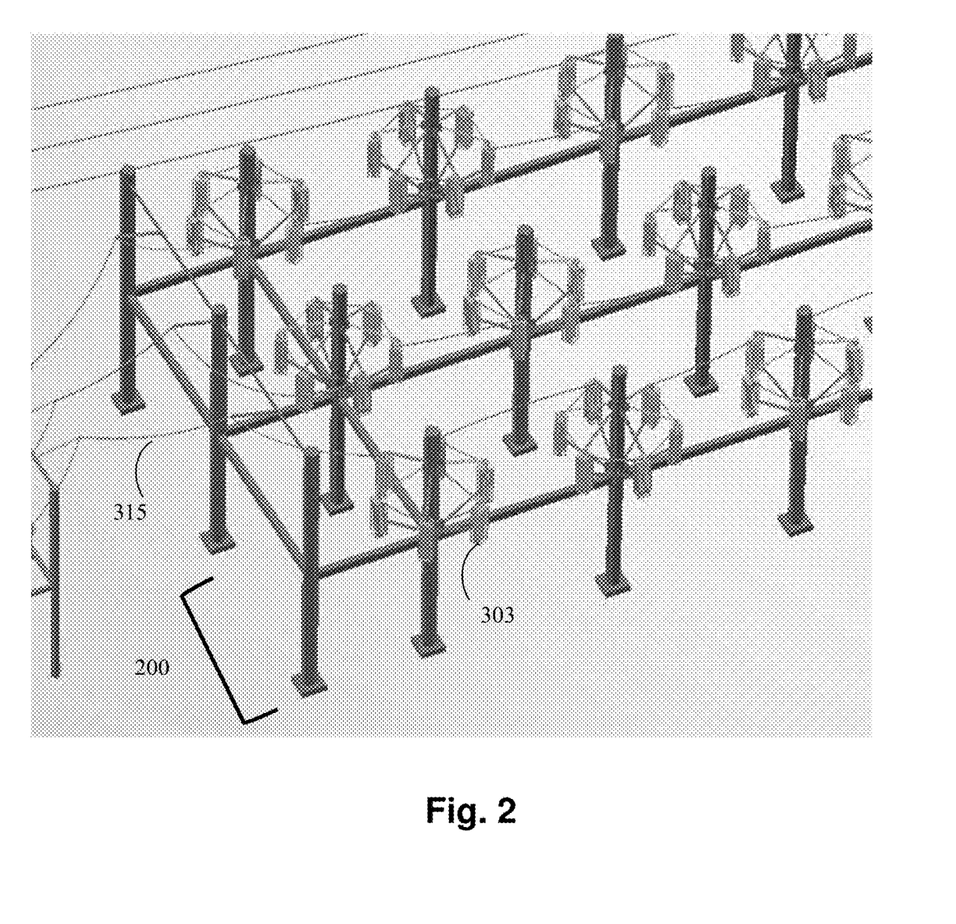
FIG. 2 is an elevation view showing an electrical injection substation connected to the power grid. (Prior art)

FIG. 2 shows an elevation view of the electrical injection substation shown in FIG. 1. A power grid typically uses three HV transmission line wires to transmit power in three different phases. Each of these three HV transmission line wires connects to a separate transmission line conductor 315. Each of the three transmission line conductors connect to a different row 200 of the array of EID devices 303.

BRIEF DESCRIPTION OF THE DRAWINGS

The drawings are made to point out and distinguish the invention from the prior art. The objects, features, and advantages of the invention are detailed in the description taken together with the drawings.

DETAILED DESCRIPTION OF THE PREFERRED EMBODIMENTS

A split-conductor electrical-injection power substation uses EIDs to inject voltage and impedance into split-conductors. Splitting the transmission line conductor into multiple, parallel wires reduces the current in each wire, allowing the use of smaller electrical-injection devices in higher current distribution systems. The transmission line conductor may be split into any number of multiple, parallel wires, including but not limited to two and three split-wires.

Figure 3A:
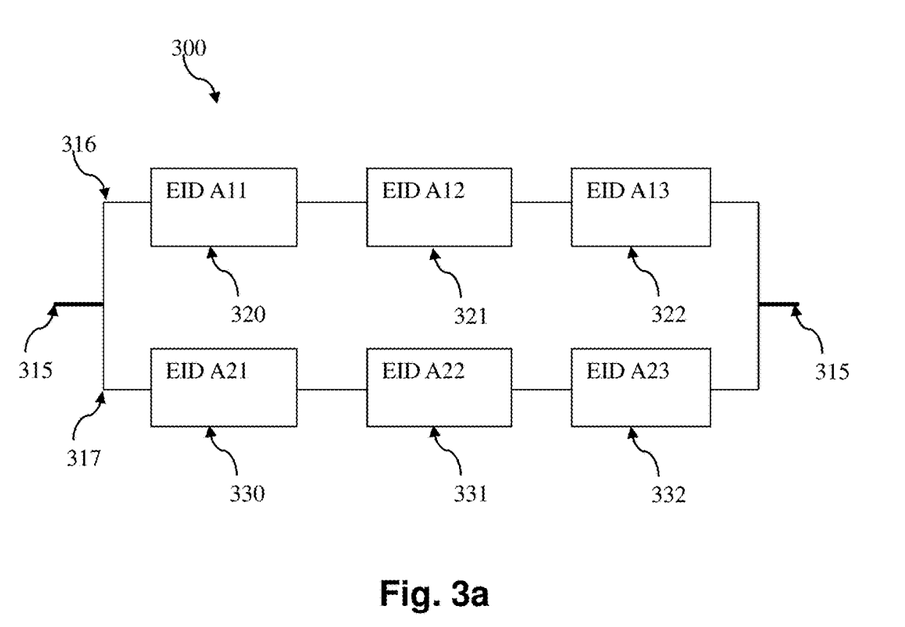
FIG. 3a is an exemplary conceptual diagram showing multiple EIDs connected to each wire of a split-conductor.

FIG. 3a is an exemplary conceptual diagram 300 showing conductor 315 splitting into wires 316 and 317. The first split-conductor 316 connects to EIDs 320, 321 and 322. The second split-conductor 317 connects to EIDs 330, 331 and 332. After electrical injection, the split-conductors 316 and 317 are rejoined to form transmission line conductor 315. Today's EIDs can inject up to 100V, next generation EID will be able to inject up to 400V, and future generations will inject even higher voltage levels. The electrical injection power substation uses as many EIDs as necessary to support the needed voltage variations of the power grid.

Figure 3B:
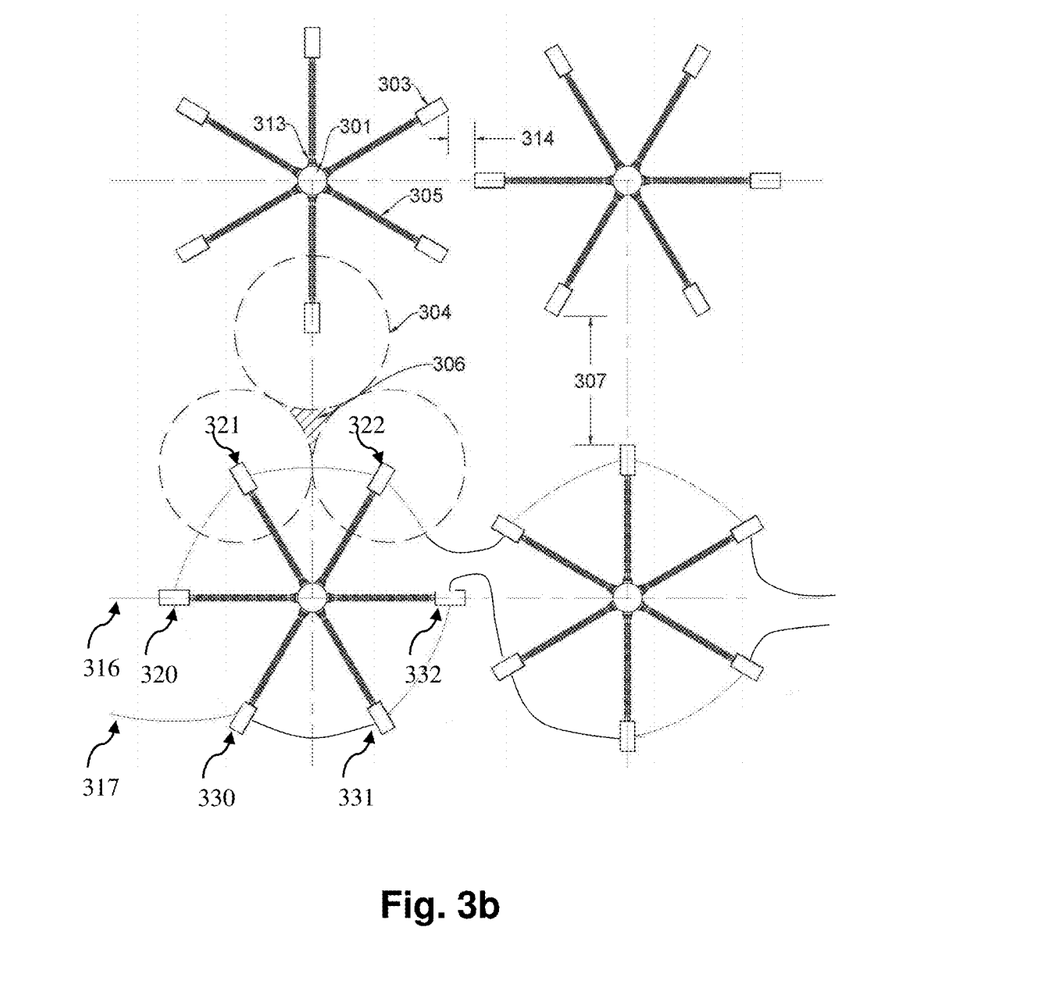
FIG. 3b is an exemplary top view of an electrical injection substation using split-conductors.

FIG. 3b is an exemplary split-conductor electrical injection substation diagram showing one way of modifying the wiring arrangement of FIG. 1 to support split-conductors. The first half 316 of the split-conductor connects to EIDs 320, 321 and 322.

The second half 317 of the split-conductor connects to EIDs 330, 331 and 332. After electrical injection, the split-conductors 316 and 317 connect to EIDs mounted on the next tower. There are many alternate ways of connecting split-conductors to EIDs. For example, the EIDs mounted on the first, third, fifth, etc. towers could all connect to the first split-conductor and the EIDs mounted on even numbered towers could connect to the second split-conductor.

In one scenario, 30 EIDs inject 100V on the first split-conductor, and 30 EIDs inject 100V on a second split-conductor. In practice, the EIDs will inject different voltages. Each EID will have a voltage injection tolerance which might typically be 1%. In a worst-case scenario the first 30 EIDs inject 100V each and the second 30 EIDs inject 99V. Thus, the two split-conductors will have a voltage differential of 30V. When the two split-conductors are connected, current will flow from the higher voltage split-conductor to the lower voltage split-conductor causing what is known as a loop current. The split-conductor wires have low impedance so a 30V differential could cause a high loop current of several hundred amps. Without regulation and control, these loop currents will be difficult to predict. For example, the loop current direction may vary from day to day. The EIDs and wires need to be able to support both the expected current and the loop current. A single EID failure will normally create a 100V voltage differential between the split-conductors. This regulation and control requires sophisticated synchronization methods to enable the devices to have a normal operation. There are numerous communication and control schemes available to control the EIDs 303.

The electrical injection substation detects loop currents by measuring the current difference between the split-conductors. For example, the first split-conductor could have a current of 600 A and a second split-conductor could have a current of 500 A. In this case, the loop current is 50 A. The electrical injection substation reduces the loop current by adjusting the injected voltages. A split-conductor controller controls the voltage injection levels of the numerous EIDs and ensures all devices are synchronized.

Figure 4:
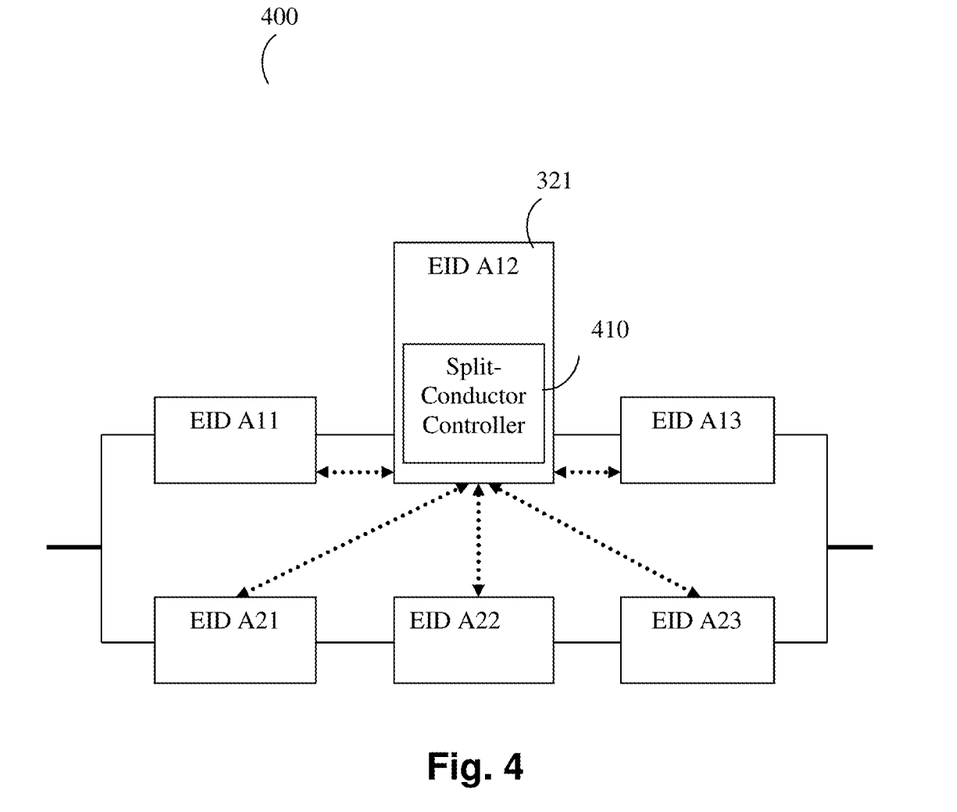
FIG. 4 is an exemplary conceptual diagram showing EIDs communicating with a split-conductor controller to control the loop current.

FIG. 4 is an exemplary conceptual diagram 400 showing EIDs communicating to control loop currents. In a preferred embodiment, the EIDs communicate in a wireless manner. In a second embodiment, the EIDs communicate used wired connections. In a preferred embodiment of FIG. 4, EID 321 contains a split-conductor controller 410 that collects information from other EIDs and sends commands to other EIDs. The split-conductor controller 410 does not need to be contained in an EID, and can be a separate device in communication with EIDs. The split-conductor controller 410 can include a current sensor, or it can collect data from other sensors.

Adjustments to the EID devices such as EID 321 may include the phase, amplitude, and frequency of impedance or voltage injection. There are multiple control schemes available to control the timing and synchronization of the EID devices 303. The overall communications and control scheme has multiple layers. The top layer, for example, may focus on power flow control levels and may have access to energy management system and SCADA data. Meanwhile, the bottom layer of communication and control may focus on impedance or voltage injection. The bottom layer may also include loop current flow minimization. In a preferred embodiment, the control of the local parameters is controlled locally within the split-conductor electrical injection substation by a split-conductor controller. Data from device controllers can be aggregated into an aggregator or network coordinator. A gateway device may collect and send data to and from the network coordinator. A manager device may control the overall power flow levels required, which is then propagated back down through a communication architecture to the EID devices.

Each EID typically has a current sensor, commonly referred to as a current transformer, allowing it to measure the current in its connected split-conductor wire. The current transformers connected to the same split-conductor will produce slightly different measurements because of manufacturing tolerances in the current transformers. In a preferred embodiment, the split-conductor controller within master EID 321 receives current measurements from multiple EIDs so it can discard erroneous values, average results, and in general determine a more accurate assessment of the current in each split-conductor. Each EID with a current sensor can measure its own current in the same time-synchronized, time-coherent fashion. The split-conductor controller compares and averages current values concurrently. In a preferred embodiment, each EID takes the root-mean-square (RMS) value of the current over one cycle, adds a time-stamp of the value, and communicates the value and time-stamp to the split-conductor controller. In alternate embodiments the EIDs take current measurements using alternative methods including a) taking an average current over a different time period, and b) using different averaging methods.

In an alternate embodiment, the split-conductor controller receives a current measurement from only one EID on each of the other split-conductor wires. In this embodiment, the split-conductor controller uses its own current measurement and compares the single current measurement for each wire.

In a preferred embodiment, the EIDs use the IEEE 1588 precision time protocol (PTP) which provides a standard method to synchronize devices on a network with sub-microsecond precision. The protocol synchronizes slave clocks to a master clock ensuring that events and timestamps in all devices use the same time base. In an alternative embodiment, the EIDs use different methods of synchronizing their clocks including (1) using the network time protocol (NTP) or (2) using laser pulses.

The split-conductor controller analyzes the current measurements and sends adjustment commands to the other EIDs, as described later.

Figure 5:
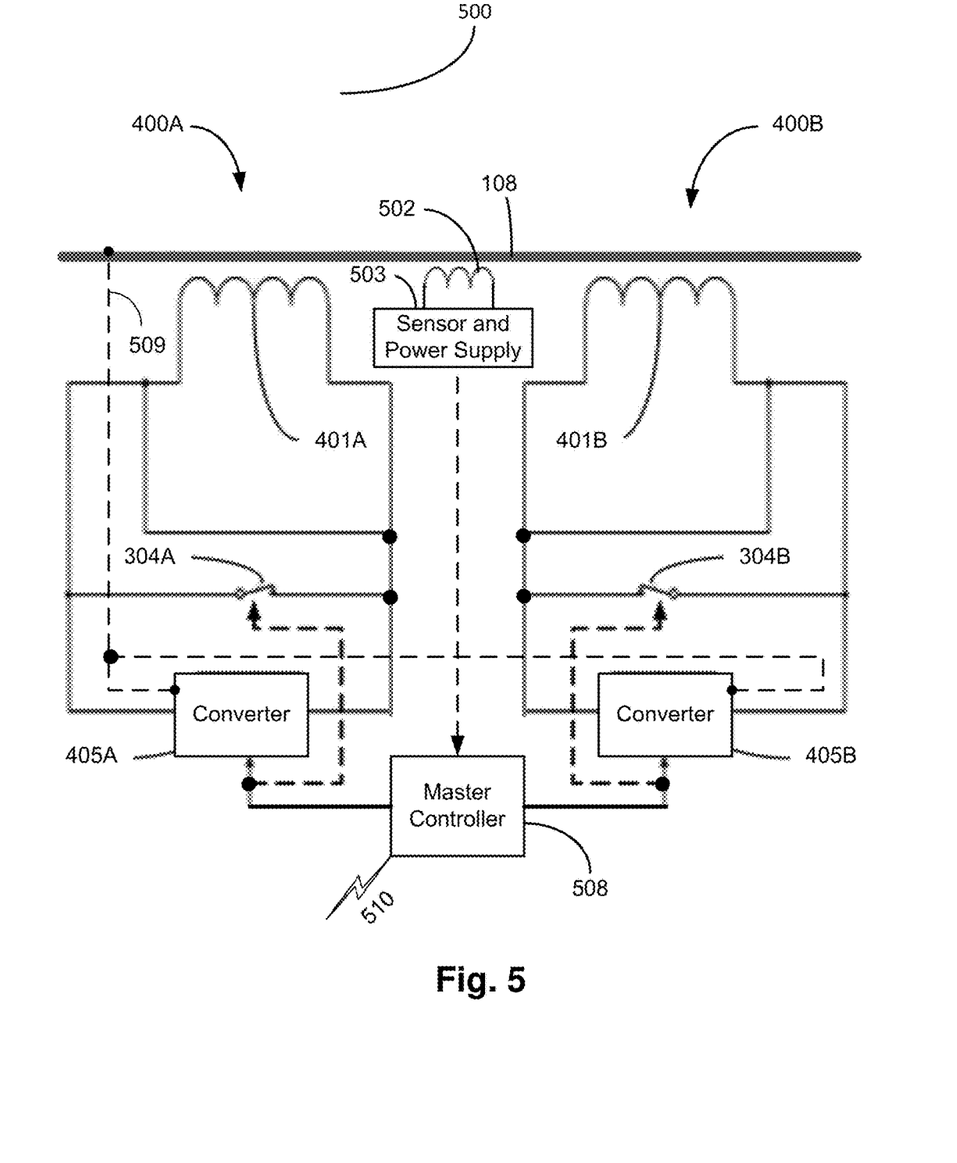
FIG. 5 is an exemplary block diagram of an EID for distributed active impedance injection on an HV transmission line.

FIG. 5 shows an exemplary EID having a plurality of secondary windings each associated with an electrical injection unit (EIU). The exemplary EIUs 400A and 400B are shown, each having a single-turn of primary winding transformer 401A and 401B, though this is not a limitation. Each EID may have multiple EIUs. It is not uncommon to have between one and more than seven EIUs in a single EID, for example. In this example, the primary winding of these transformers is the HV transmission line 108. Within the split-conductor electrical injection substation the HV transmission line 108 is a split-conductor wire. Other EIDs will connect the HV transmission line 108 to a multi-turn primary winding. The secondary windings of the transformers are electrically isolated from ground, being at the HV transmission line voltage, and are inductively coupled to the primary winding 108 using independent ungapped cores. In alternate embodiments, the EID can be a transformer-less solution.

The secondary circuit of each of the injection transformers 401A and 401B comprise power-electronic circuits for generation and injection of the inductive and capacitive impedances on to the HV transmission line 108. Each of the secondary winding circuits of the EIUs 400A and 400B is similar in structure, and as such, the block diagram is explained using the EIU 400A. The EIU 400A has a single-turn injection transformer 401A, having a shorting switch 304A across its secondary winding 401A-2 and a power converter 405A for generating the necessary voltages and currents at the appropriate phase angle for injecting on to the HV transmission line 108 via the single-turn injection transformer 401A coupled to it.

A master controller 508 in each EID is common to all the EIUs in an EID is enabled to sense the HV transmission line 108 current by way of a current transformer, with a separate power supply transformer providing power to the master controller, both shown schematically in FIG. 5 as sensor and power-supply transformer 502 coupled to the HV transmission line 108 via a sensor and power supply module 503. The master controller 508 provides the needed control instructions to the power converter 405A to generate and to inject the needed injection voltages to be impressed on the HV transmission line 108 for HV transmission line balancing and loop current control as commanded by the split-conductor controller 410 (FIG. 4). In other embodiments, the respective converter/inverter controllers may provide alternate redundant master-controller architectures. Therefore, the specific embodiment shown and described here is only representative. Within the split-conductor electrical injection substation the master controller 508 implements the functions of the split-conductor controller.

The single master controller 508 is also enabled to sense via the sensor and power supply transformer 502 and the connected sensor and power supply module 503 when over-current conditions exist in the HV transmission line and to provide instruction to the switch 304A to short the secondary winding 401A-2 of the injection transformer 401A in order to protect the power-electronic circuits and components connected to the secondary winding 401A-2 of the injection transformer 401A from damage due to high voltages and currents. Also as stated before, the sensor and power supply module 503 is also enabled to extract power from the line and provide the DC supply voltages needed by the power-electronics circuits connected to the secondary winding 401A-2 of the injection transformer 401A. Further as discussed before, the same set of components and blocks are repeated for the same functionality implemented by the second injection block 400B (EIU) and any further EIUs in the respective EID. The master controller 508 also contains a transceiver that provides the capability for the module containing the plurality of injection blocks for communication to the outside world to provide status and to be externally controlled and configured for operation. An exemplary virtual ground connection 509 from the secondary circuit to the HV transmission line is shown as grounding the converters 405A and 405B to the HV transmission line itself to eliminate any possibility of voltages accumulating between the EIDs and the HV transmission line.

The split-conductor electrical-injection power substation uses the split-conductor controller 410 (FIG. 3) that may be embodied in an EID or as a separate device to communicate with all EIDs of the respective group of split-conductors. The split-conductor controller 410 receives current measurements from the EIDs of that group of EIDs and transmits (or couples) electrical injection adjustment commands to all such EIDs. The non-master EID's master controllers 508 transmit current measurements to and receive electrical injection adjustment commands from the split-conductor controller. All EID's master controllers 508 communicate using the wireless communication unit 510. The master controller 508 may be implemented in many ways including a) as a processor with instructions in a memory; b) as an ASIC; c) as programmable logic.

Figure 6:
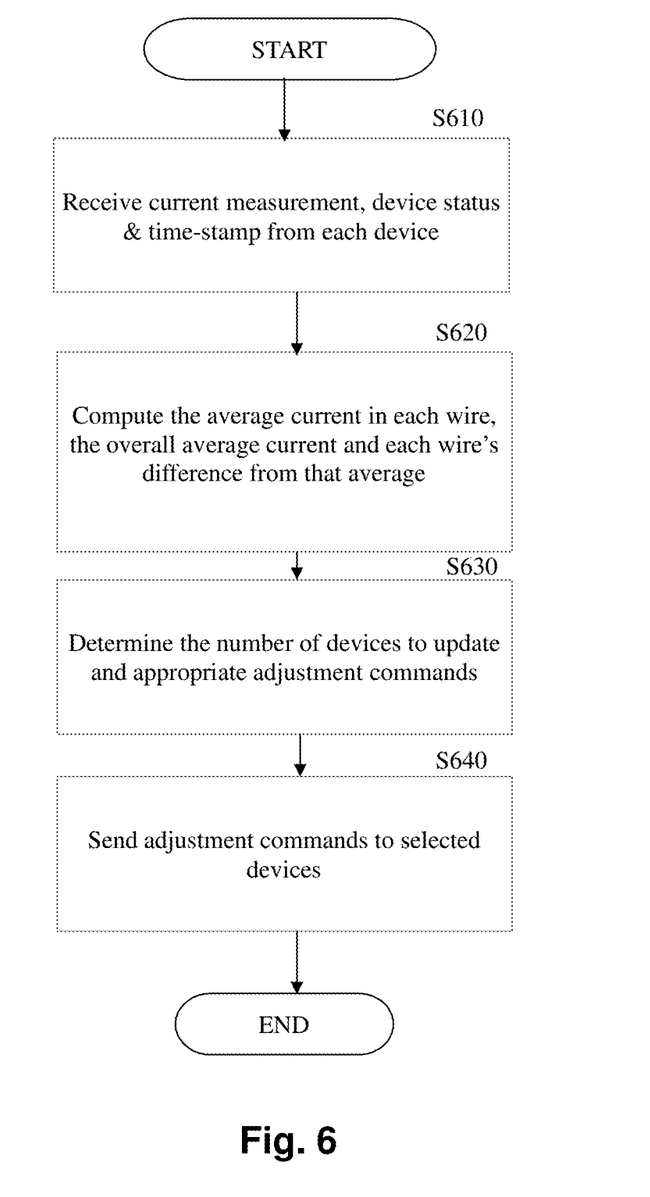
FIG. 6 is an exemplary flowchart showing the actions of the split-conductor controller.

FIG. 6 is an exemplary flowchart 600 showing the actions of the split-conductor controller. In step S610 the split-conductor controller receives current measurements, status information, and time-stamps from the other EIDs. In one embodiment the split-conductor controller requests this information. In an alternate embodiment, the EIDs send their own information to the split-conductor controller without it being requested. The status information describes the EID status and includes: a) whether the current measurement is valid; and b) whether the electric injection unit or units are working. The timestamp indicates when the current measurement was made.

In S620 the split-conductor controller computes the average current in each split-conductor wire. The split-conductor controller rejects invalid current measurements and measurements that lie too far from the median. The split-conductor controller compares the average current in each split-conductor wire to determine the current flows and whether injected voltages need to be increased or decreased.

In S630 the split-conductor controller 410 determines what adjustments need to be made, both for HV transmission line balancing and for loop current control. The split-conductor controller 410 decides which EIDs should be adjusted and what that adjustment should be. An EID may contain one or more electrical-injection units (EIUs). The split-conductor controller uses the following decision criteria:

a) If an EIU has just unexpectedly stopped (or started) working, then prepare commands to tell one EIU attached to each of the other split-conductor wires to stop (or start) working.
b) If the current differential is too large, then shut down the electric injection substation (disable the EIUs at the respective substation).
c) If the adjustment commands are not reducing the current differential, then shut down the electric injection substation (disable the EIUs at the respective substation).
d) If the current differential is small, then prepare adjustment commands to change the injected voltage for one EIU attached to each of the other split-conductor wires.
e) If the current differential is large, then prepare adjustment commands to change the injected voltage for each EIU.
f) If multiple EIUs are used to sense current in each split-conductor wire and the current sensed by one EIU for one split-conductor wire is erroneous for some reason, that sensed current is discarded and the remaining sensed currents for the remaining split-conductor wires are combined and used as the sensed current for that split-conductor.

In S640 the split-conductor controllers send the adjustment commands to the selected EIUs and EIDs.

In operation of the overall power distribution system, commands are sent wirelessly to the EIDs from one or more a) other substations, b) localized intelligence centers or c) the utility supervisory for power flow control, and the resulting loop currents are sensed by the EIDs, with feedback of the current measurements at the current sensing EIDs to the applicable split-conductor controller to reduce any sensed loop currents in the split conductors. The current measurements may be RMS values, average values, such as over one or more AC cycles, time synchronized substantially instantaneous values, or any other measurement desired. Any loop current measurement that differs by more than a predetermined amount from the other loop current measurements for the same split-conductor, such as the average of the currents sensed by other current sensors for the same split-conductor, is disregarded and the loop current control is based on the remaining current measurements, or alternatively, the EID is disabled and another EID is activated for that split-conductor in its place.

Thus the present invention has a number of aspects, which aspects may be practiced alone or in various combinations or sub-combinations, as desired. Also while certain preferred embodiments of the present invention have been disclosed and described herein for purposes of exemplary illustration and not for purposes of limitation, it will be understood by those skilled in the art that various changes in form and detail may be made therein without departing from the spirit and scope of the invention.

What is claimed is:

1. A method of controlling power in a high voltage power distribution system comprising:
for each conductor of the high voltage power distribution system:
splitting the conductor into multiple split-conductors in a substation;
coupling multiple electrical injection devices to each of the multiple split-conductors;
sensing the current in each split-conductor; and
controlling the multiple electrical injection devices to tend to equalize the currents in the split-conductors.

2. The method of claim 1 further comprising controlling the multiple electrical injection devices to control power flow in the conductors of the high voltage power distribution system.

3. The method of claim 2 wherein the multiple electrical injection devices are controlled wirelessly to control power flow in the conductors of the high voltage power distribution system and to equalize the currents in the split-conductors from a split-conductor controller that controls the electrical injection devices collectively responsive to a command for equalizing the currents in the conductors of the high voltage power distribution system, with feedback reapportioning the collective control of the electrical injection devices between electrical injection devices on different split-conductors of each conductor of the high voltage power distribution system to tend to equalize the currents in the respective split-conductors.

4. The method of claim 2 wherein the commands for controlling the multiple electrical injection devices to control power flow in the conductors of the high voltage power distribution system are received wirelessly from one or more a) substations, b) localized intelligence centers or c) the utility supervisory.

5. The method of claim 1 wherein the current in each split-conductor is sensed in all or less than all multiple electrical injection devices coupled to the respective multiple split-conductors and the currents sensed are combined for the measure of the current in the respective split-conductor.

6. The method of claim 5 wherein the currents sensed in each split-conductor are averaged over one or multiple cycles of the alternating current.

7. The method of claim 5 wherein the currents sensed in each split-conductor are RMS currents sensed over one or more cycles time-synchronized with all sensed currents in the split-conductors of the respective conductor of the high voltage power distribution system.

8. The method of claim 5 wherein when a difference between a current sensed and other sensed currents for a split-conductor exceeds a predetermined difference, the respective electrical injection device is disabled and another electrical injection device coupled to the same split conductor is enabled to provide for the electrical injection intended for the disabled electrical injection device.

9. The method of claim 5 wherein when a difference between one current sensed and other sensed currents for a split-conductor exceeds a predetermined difference, that one current sensed is disregarded and the other currents sensed are combined for the measure of the current in the respective split-conductor.

10. The method of claim 1 wherein the number of split-conductors or each conductor is two.

11. The method of claim 1 wherein the number of split-conductors or each conductor is three.

* * * * *